United States Patent
Wang et al.

(10) Patent No.: US 11,375,124 B2
(45) Date of Patent: Jun. 28, 2022

(54) OPTICAL MEASUREMENT EQUIPMENT AND METHOD FOR MEASURING WARPAGE OF A WORKPIECE

(71) Applicant: Advanced Semiconductor Engineering, Inc., Kaohsiung (TW)

(72) Inventors: Ming-Han Wang, Kaohsiung (TW); Ian Hu, Kaohsiung (TW); Meng-Kai Shih, Kaohsiung (TW); Hsuan Yu Chen, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 93 days.

(21) Appl. No.: 16/285,000

(22) Filed: Feb. 25, 2019

(65) Prior Publication Data
US 2020/0275030 A1 Aug. 27, 2020

(51) Int. Cl.
| | |
|---|---|
| H04N 5/232 | (2006.01) |
| H04N 5/247 | (2006.01) |
| G06T 7/00 | (2017.01) |
| H04N 5/225 | (2006.01) |

(52) U.S. Cl.
CPC ....... *H04N 5/23299* (2018.08); *G06T 7/0004* (2013.01); *H04N 5/2253* (2013.01); *H04N 5/247* (2013.01); *G06T 2207/30164* (2013.01)

(58) Field of Classification Search
CPC .. G01B 11/245; G01B 2210/56; G01B 11/16; G01C 11/04; G06T 2207/30164; G06T 7/0004; H04N 5/2251; H04N 5/2253; H04N 5/23299; H04N 5/247
See application file for complete search history.

(56) References Cited

U.S. PATENT DOCUMENTS

| | | | |
|---|---|---|---|
| 9,891,048 B2 | 2/2018 | Park et al. | |
| 2002/0054704 A1* | 5/2002 | Smilansky | G01N 21/94 382/149 |
| 2003/0218741 A1* | 11/2003 | Guetta | G01N 21/9503 356/237.1 |
| 2014/0009601 A1* | 1/2014 | Cho | G01N 21/9501 348/126 |
| 2014/0347465 A1* | 11/2014 | Takahashi | G06T 7/0004 348/87 |
| 2015/0211852 A1* | 7/2015 | Park | G01C 11/04 348/92 |
| 2016/0238373 A1* | 8/2016 | Featherstone | G01B 11/24 |
| 2016/0375524 A1* | 12/2016 | Hsu | B23K 37/00 228/8 |
| 2017/0032540 A1* | 2/2017 | Goehnermeier | H04N 7/183 |
| 2017/0070653 A1* | 3/2017 | Irschick | H04N 13/243 |
| 2017/0169559 A1* | 6/2017 | Tsai | G06T 7/0004 |
| 2018/0106595 A1* | 4/2018 | Christoph | H04N 5/2251 |
| 2019/0025048 A1* | 1/2019 | Ohyama | G01B 11/0608 |
| 2020/0158497 A1* | 5/2020 | Arnoult | G01B 11/2522 |

* cited by examiner

*Primary Examiner* — Mohammed S Rahaman
(74) *Attorney, Agent, or Firm* — Foley & Lardner LLP

(57) ABSTRACT

An optical measurement equipment includes an adjustment apparatus and at least two image capturing devices. The image capturing devices have a depth-of-field and attached to the adjustment apparatus. The image capturing devices are adjusted by the adjustment apparatus such that a portion to be measured of a workpiece is located within the depth-of-field of the image capturing devices.

21 Claims, 11 Drawing Sheets

OPTICAL MEASUREMENT EQUIPMENT AND METHOD FOR MEASURING WARPAGE OF A WORKPIECE

BACKGROUND

1. Field of the Disclosure

The present disclosure relates to an optical measurement equipment, and a measuring method, and to an optical measurement equipment including at least two adjustable image capturing devices, and a method for measuring warpage of a workpiece.

2. Description of the Related Art

For the semiconductor packaging technology, warpage or deformation may occur to a substrate (e.g., a wafer or a panel) due to the variation of ambient temperature. Such warpage or deformation should be controlled; otherwise, the substrate may break, or the elements on the substrate may crack or delaminate. In addition, the warpage or deformation of the substrate may adversely influence the subsequent process such as molding process or singulation process. Thus, warpage control or deformation control is an issue affecting the yield of the manufacturing process. In order to improve the warpage control or deformation control, measuring the warpage or deformation of the substrate under different temperatures precisely is desired. Such measured result may facilitate the modification of the manufacturing process parameters, the material design and/or the arrangement of the elements on the substrate.

SUMMARY

In some embodiments, an optical measurement equipment includes an adjustment apparatus and at least two image capturing devices. The image capturing devices have a depth-of-field and attached to the adjustment apparatus. The image capturing devices are adjusted by the adjustment apparatus such that a portion to be measured of a workpiece is located within the depth-of-field of the image capturing devices.

In some embodiments, an optical measurement equipment includes an adjustment apparatus, a distance measuring apparatus and at least two image capturing devices. The distance measuring apparatus is attached to the adjustment apparatus for measuring a distance between the distance measuring apparatus and a portion to be measured of a workpiece. The image capturing devices are attached to the adjustment apparatus, and are adjusted by the adjustment apparatus according to the measured result from the distance measuring apparatus.

In some embodiments, a method for measuring warpage of a workpiece includes: (a) disposing a workpiece on a receiving surface under at least two image capturing devices, wherein the image capturing devices have a depth-of-field; and (b) adjusting the image capturing devices such that a portion to be measured of the workpiece is located within the depth-of-field of the image capturing devices.

BRIEF DESCRIPTION OF THE DRAWINGS

Aspects of some embodiments of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1:
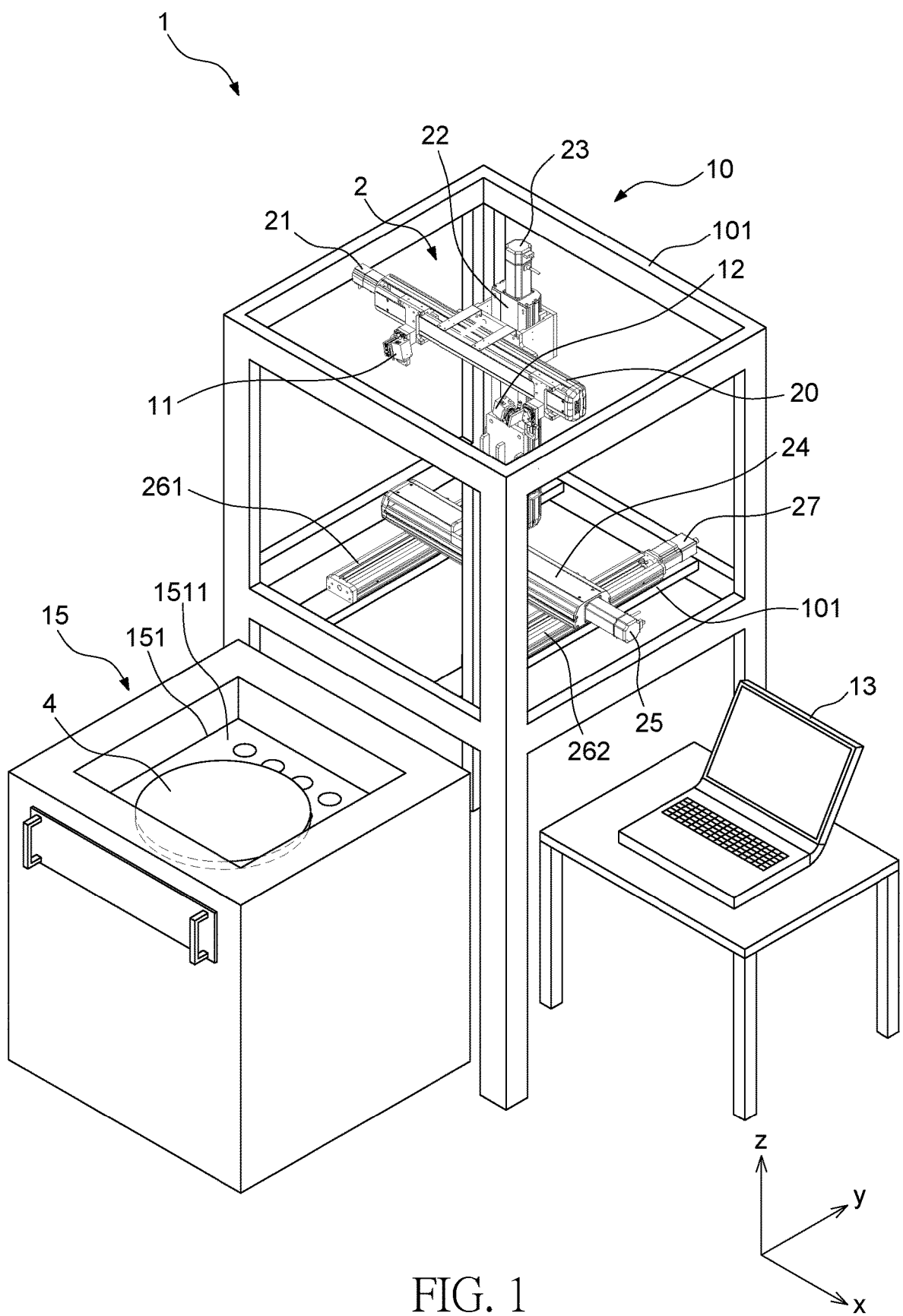
FIG. 1 illustrates a perspective view of an optical measurement equipment according to some embodiments of the present disclosure.

Common reference numerals are used throughout the drawings and the detailed description to indicate the same or similar components. Embodiments of the present disclosure will be readily understood from the following detailed description taken in conjunction with the accompanying drawings.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In order to measure the warpage or deformation of the substrate, in a comparative embodiment, at least two global cameras and at least two local cameras are provided above the substrate. The global cameras and the local cameras are fixedly disposed on a table. The local cameras have a depth-of-field (DOF). The images captured by the local cameras are clear and identifiable when the target area is located inside or within the depth-of-field of the local cameras. The table can slide on a first rail in x-axis direction, and the first rail can slide on two second rails in y-axis direction. Thus, the cameras (including the global cameras and the local cameras) can move to any position in a horizontal plane. During a temperature rising or temperature descending process, the greatest warpage may occur at the periphery of the substrate. For a worst case, the warpage is too large so that a portion of the substrate is located outside the depth-of-field of the local cameras. That is, the portion of the substrate may be located above or under the depth-of-field of the local cameras. Thus, images captured by the local cameras are not clear and identifiable (which is referred to as "graphic glitch"), and the warpage degree of the portion of the substrate cannot be measured or detected. If such "graphic glitch" happens, the local cameras should be adjusted again, and the substrate should be heated and/or cooled again. The adjustment method is to loosen the screw manually, adjust linear or angular position of the local cameras manually, and then lock the screw manually to fix the local cameras. As a result, much time will be expended in the measuring process, and the positioning of the local cameras is not very precise. In addition, since the substrate is frequently heated and cooled, the stability of the substrate and the stability of the elements on the substrate will be reduced. Thus, the accuracy and reliability of the measurement is adversely influenced.

At least some embodiments of the present disclosure provide for an optical measurement equipment which includes at least two adjustable image capturing devices. In some embodiments, the image capturing devices may move in three-dimensional directions (e.g., x-axis, y-axis and z-axis) and rotate automatically. At least some embodiments of the present disclosure further provide for techniques for measuring warpage of a workpiece.

FIG. 1 illustrates a perspective view of an optical measurement equipment 1 according to some embodiments of the present disclosure. The optical measurement equipment 1 includes a frame structure 10, an adjustment apparatus 2, at least two image capturing devices (including, for example, a first image capturing device 11 and a second image capturing device 12), a controller 13 and an oven 15. The optical measurement equipment 1 can be used to measure a warpage and/or strain of a workpiece 4.

The frame structure 10 includes a plurality of rigid frame sections 101 fixedly connected to each other. The adjustment apparatus 2 is disposed in or on the frame structure 10. In one embodiment, the adjustment apparatus 2 is disposed fixedly on two parallel frame sections 101 of the frame structure 10. The image capturing devices (including, for example, the first image capturing device 11 and the second image capturing device 12) are attached to the adjustment apparatus 2. The controller 13 (e.g., a computer or a processor) is electrically connected to the adjustment apparatus 2 for controlling the locations and/or the orientations of the image capturing devices (including, for example, the first image capturing device 11 and the second image capturing device 12). The oven 15 is used for accommodating and heating the workpiece 4. The oven 15 is disposed under the adjustment apparatus 2 during a measuring operation. As shown in FIG. 1, the oven 15 includes a receiving plate 151. The receiving plate 151 has a receiving surface 1511 for receiving the workpiece 4. That is, the workpiece 4 is disposed on the receiving surface 1511 of the receiving plate 151.

Figure 2:
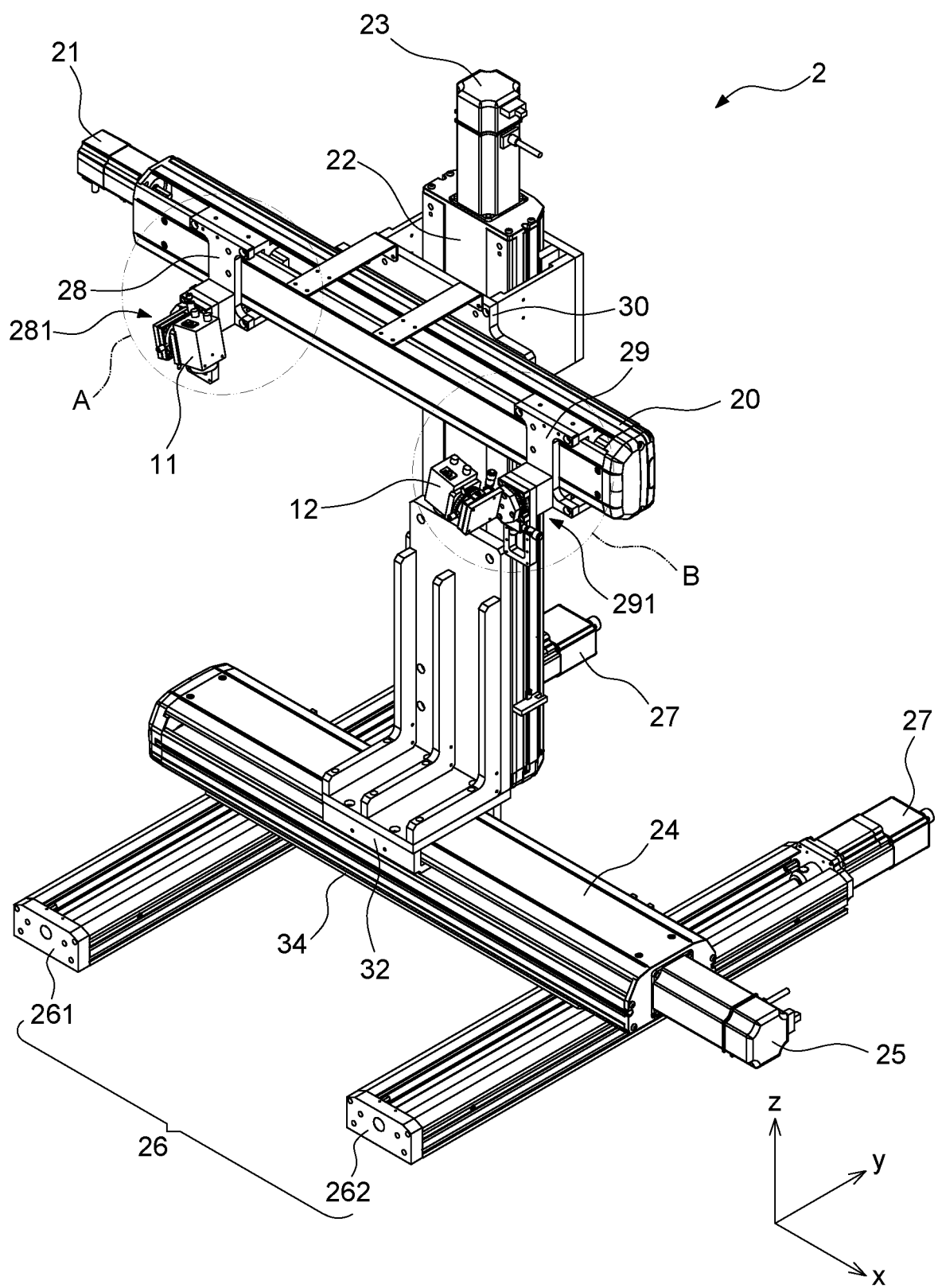
FIG. 2 illustrates a perspective view of the adjustment apparatus of the optical measurement equipment of FIG. 1.
Figure 3:
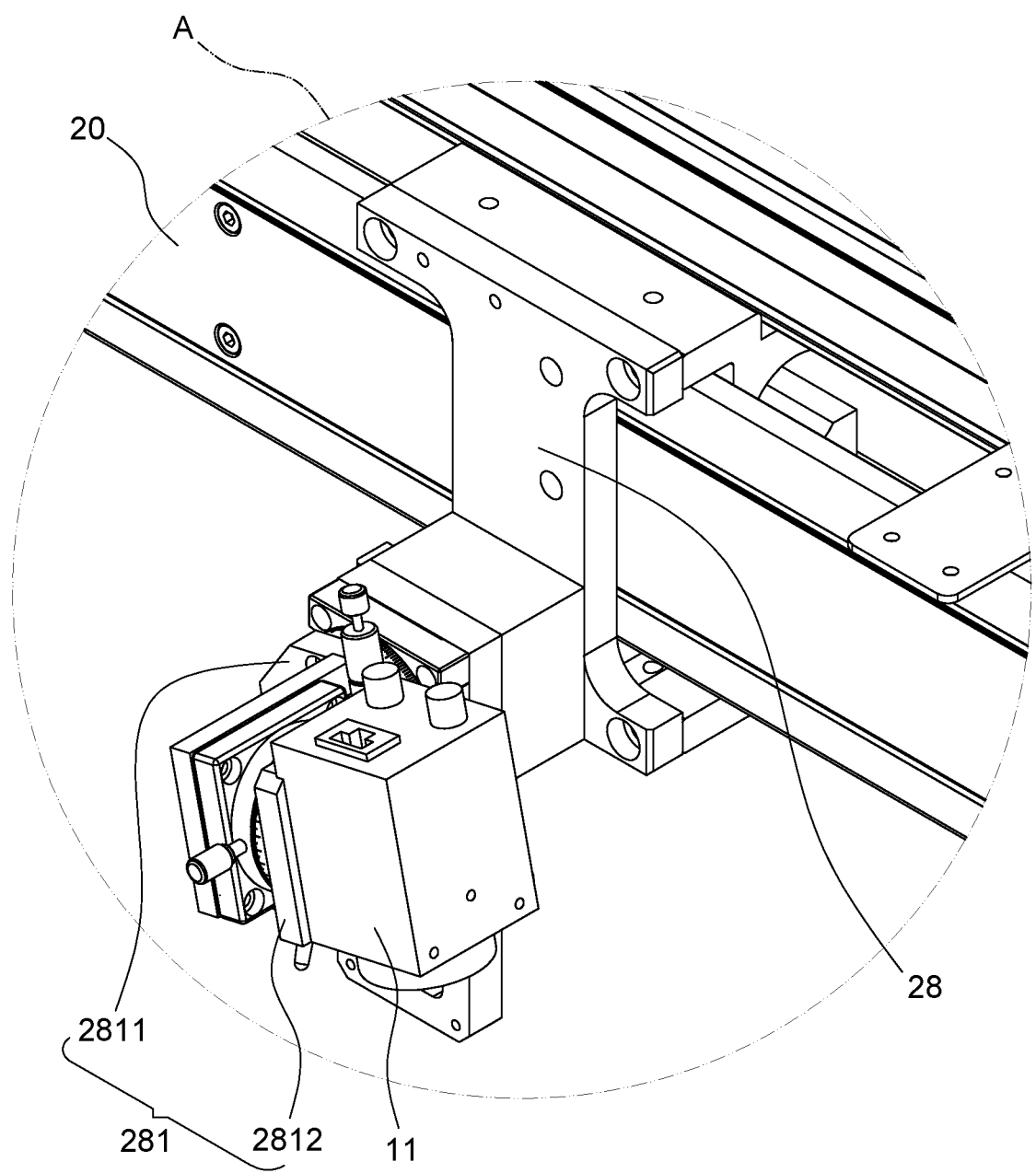
FIG. 3 illustrates an enlarged view of an area "A" shown in FIG. 2.
Figure 4:
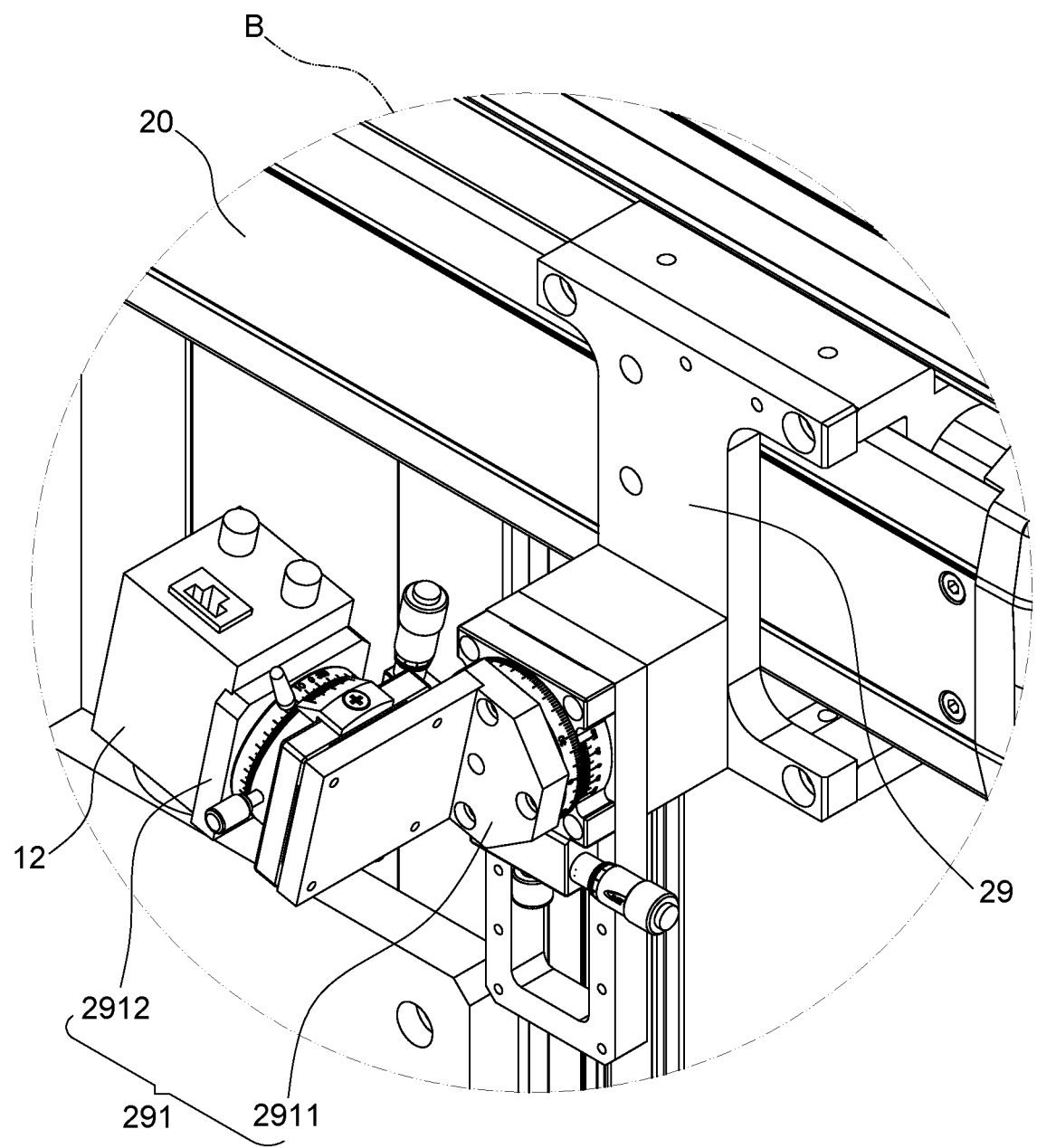
FIG. 4 illustrates an enlarged view of an area "B" shown in FIG. 2.

FIG. 2 illustrates a perspective view of the adjustment apparatus 2 of the optical measurement equipment 1 of FIG. 1. FIG. 3 illustrates an enlarged view of an area "A" shown in FIG. 2. FIG. 4 illustrates an enlarged view of an area "B" shown in FIG. 2. As shown in FIG. 2, the adjustment apparatus 2 includes a holding structure 20, a main movement driving device 21, a first guide structure 22, a first movement driving device 23, a second guide structure 24, a second movement driving device 25, a third guide structure 26, a third movement driving device 27, a first movable platform 28, a first angle adjustment device 281, a second movable platform 29 and a second angle adjustment device 291. In one embodiment, the holding structure 20 may be a sliding table disposed horizontally. As shown in FIG. 2, the holding structure 20 extends along the x-axis. The first movable platform 28 and the second movable platform 29 are movably attached (e.g., slidably attached) to the holding structure 20. Thus, the first movable platform 28 and the second movable platform 29 can slide on the holding structure 20 in the x-axis direction. The main movement driving device 21 is connected to the holding structure 20 for driving the first movable platform 28 and the second movable platform 29 to move (e.g., slide). In one embodiment, the main movement driving device 21 may be a servo motor, and each of the first movable platform 28 and the second movable platform 29 may be connected with the main movement driving device 21 through a set of lead screw. In one embodiment, the main movement driving device 21 may drive the first movable platform 28 and the second movable platform 29 to move (e.g., slide) to the left or to the right simultaneously in a same direction. Alternatively, the main movement driving device 21 may drive the first movable platform 28 and the second movable platform 29 to move (e.g., slide) to the left or to the right simultaneously but in opposite directions.

The first angle adjustment device 281 is disposed fixedly on the first movable platform 28, and the second angle adjustment device 291 is disposed fixedly on the second movable platform 29. As shown in FIG. 3, the first angle adjustment device 281 includes a first rotary stage 2811 and a second rotary stage 2812. The first rotary stage 2811 is disposed on the first movable platform 28. The second rotary stage 2812 is disposed on and substantially perpendicular to the first rotary stage 2811. Thus, a rotation axis of the second rotary stage 2812 is substantially perpendicular to a rotation axis of the first rotary stage 2811. The rotation axis of first rotary stage 2811 may be parallel with the y-axis direction. As shown in FIG. 4, the second angle adjustment device 291 includes a first rotary stage 2911 and a second rotary stage 2912. The first rotary stage 2911 is disposed on the second movable platform 29. The second rotary stage 2912 is disposed on and substantially perpendicular to the first rotary stage 2911. Thus, a rotation axis of the second rotary stage 2912 is substantially perpendicular to a rotation axis of first rotary stage 2911. The rotation axis of first rotary stage 2911 may be parallel with the y-axis direction.

As shown in FIG. 2, each of the first image capturing device 11 and a second image capturing device 12 may be a charge coupled device (CCD) camera or other suitable device. One side of the first image capturing device 11 is disposed fixedly on the second rotary stage 2812 (FIG. 3) of the first angle adjustment device 281. Thus, the first image capturing device 11 is movably attached and rotatably attached to the holding structure 20. That is, the first image capturing device 11 can slide on the holding structure 20 in the x-axis direction through the first movable platform 28. Further, the orientation (e.g., angle) of the first image capturing device 11 can be adjusted along two a rotation axes (the rotation axis of the second rotary stage 2812 and the rotation axis of the first rotary stage 2811) through the first angle adjustment device 281. In one embodiment, the second rotary stage 2812 may be omitted, and the first image capturing device 11 may be disposed fixedly on the first rotary stage 2811. Similarly, one side of the second image capturing device 12 is disposed fixedly on the second rotary stage 2912 (FIG. 4) of the second angle adjustment device 291. Thus, the second image capturing device 12 is movably attached and rotatably attached to the holding structure 20. That is, the second image capturing device 12 can slide on the holding structure 20 in the x-axis direction through the second movable platform 29. Further, the orientation (e.g., angle) of the second image capturing device 12 can be adjusted along two a rotation axes (the rotation axis of the second rotary stage 2912 and the rotation axis of the first rotary stage 2911) through the second angle adjustment device 291. In one embodiment, the second rotary stage 2912 may be omitted, and the second image capturing device 12 may be disposed fixedly on the first rotary stage 2911.

In one embodiment, the first guide structure 22 may be a sliding table or a sliding rail disposed vertically. As shown in FIG. 2, the first guide structure 22 extends along a first direction (e.g., the z-axis). A first movable stage 30 is movably attached (e.g., slidably attached) to the first guide structure 22. Thus, the first movable stage 30 can slide on the first guide structure 22 in the z-axis direction. The first movement driving device 23 is connected to the first guide structure 22 for driving the first movable stage 30 to move (e.g., slide). In one embodiment, the first movement driving device 23 may be a servo motor, and the first movable stage 30 may be connected with the first movement driving device 23 through a set of lead screw. In one embodiment, a portion (e.g., a center portion) of the holding structure 20 is disposed fixedly on the first movable stage 30. Thus, the holding structure 20 is movably attached (e.g., slidably attached) to the first guide structure 22. That is, the holding structure 20 can slide on the first guide structure 22 in the z-axis direction through the first movable stage 30 under the control of the first movement driving device 23.

In one embodiment, the second guide structure 24 may be a sliding table or a sliding rail disposed horizontally. As shown in FIG. 2, the second guide structure 24 extends along a second direction (e.g., the x-axis). The second direction (e.g., the x-axis) is perpendicular to the first direction (e.g., the z-axis). A second movable stage 32 is movably attached (e.g., slidably attached) to the second guide structure 24. Thus, the second movable stage 32 can slide on the second guide structure 24 in the x-axis direction. The second movement driving device 25 is connected to the second guide structure 24 for driving the second movable stage 32 to move (e.g., slide). In one embodiment, the second movement driving device 25 may be a servo motor, and the second movable stage 32 may be connected with the second movement driving device 25 through a set of lead screw. In one embodiment, a portion (e.g., a bottom portion) of the first guide structure 22 is disposed fixedly on the second movable stage 32. Thus, the first guide structure 22 is movably attached (e.g., slidably attached) to the second guide structure 24. That is, the first guide structure 22 can slide on the second guide structure 24 in the x-axis direction through the second movable stage 32 under the control of the second movement driving device 25.

In one embodiment, the third guide structure 26 may include two guide portions 261, 262. Each of the guide portions 261, 262 may be a sliding table or a sliding rail disposed horizontally. As shown in FIG. 1, the guide portions 261, 262 are disposed fixedly on two parallel frame sections 101 of the frame structure 10 respectively. As shown in FIG. 2, the third guide structure 26 (including the guide portions 261, 262) extends along a third direction (e.g., the y-axis). The third direction (e.g., the y-axis) is perpendicular to the second direction (e.g., the x-axis) and the first direction (e.g., the z-axis). A third movable stage 34 is movably attached (e.g., slidably attached) to the third guide structure 26. Two ends of the third movable stage 34 are disposed on the guide portions 261, 262 respectively. Thus, the third movable stage 34 can slide on the third guide structure 26 (including the guide portions 261, 262) in the y-axis direction. The third movement driving device 27 is connected to the third guide structure 26 (including the guide portions 261, 262) for driving the third movable stage 34 to move (e.g., slide). In one embodiment, the third movement driving device 27 may be a servo motor, and the third movable stage 34 may be connected with the third movement driving device 27 through a set of lead screw. In one embodiment, a portion (e.g., a bottom portion) of the second guide structure 24 is disposed fixedly on the third movable stage 34. Thus, the second guide structure 24 is movably attached (e.g., slidably attached) to the third guide structure 26 (including the guide portions 261, 262). That is, the second guide structure 24 can slide on the third guide structure 26 (including the guide portions 261, 262) in the y-axis direction through the third movable stage 34 under the control of the third movement driving device 27.

Figure 5:
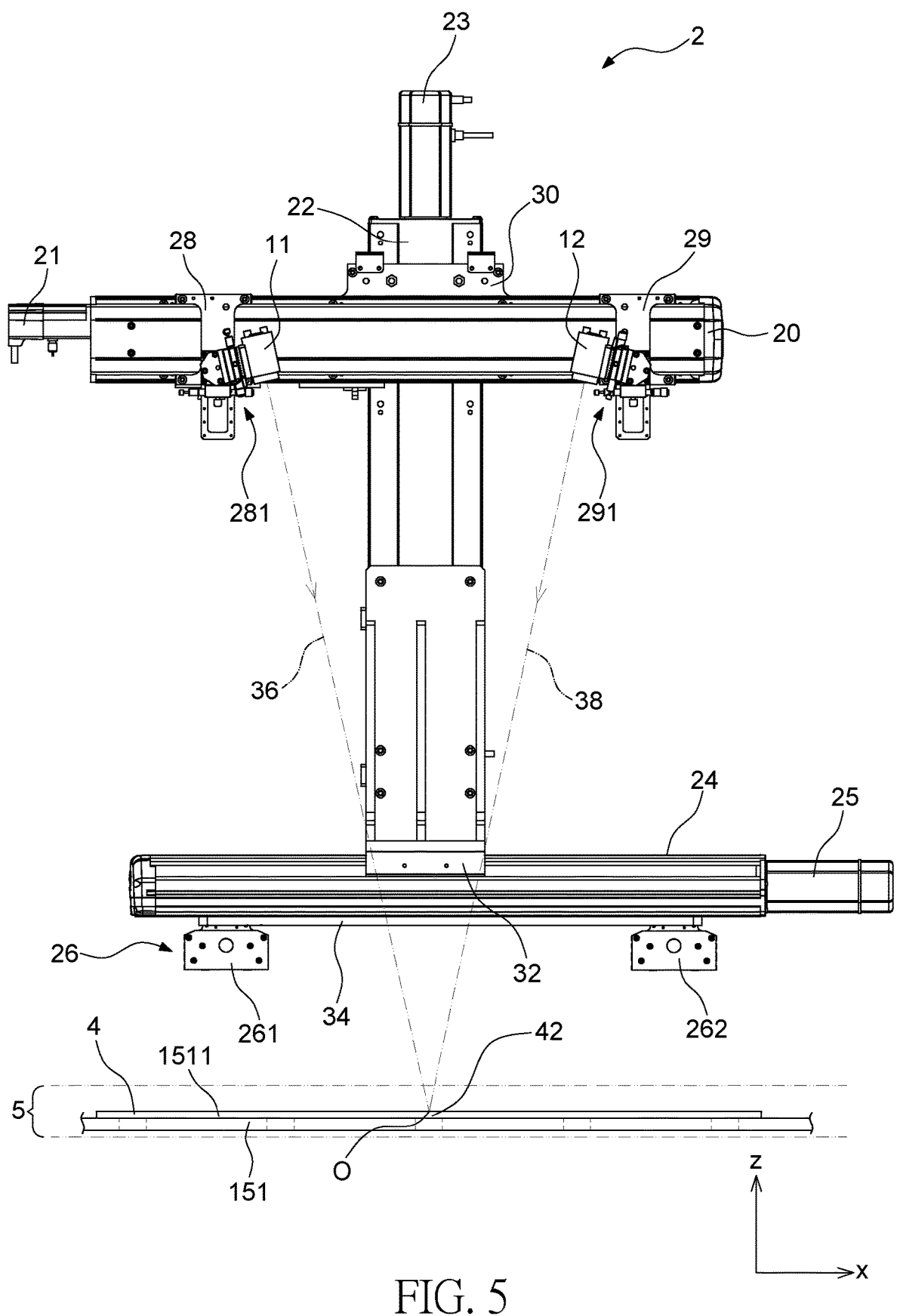
FIG. 5 illustrates a front view of the adjustment apparatus and the workpiece of the optical measurement equipment of FIG. 1.

FIG. 5 illustrates a front view of the adjustment apparatus 2 and the workpiece 4 of the optical measurement equipment 1 of FIG. 1. The image capturing devices (including, for example, the first image capturing device 11 and the second image capturing device 12) may be electrically connected to the controller 13 or other suitable analysis device. The image capturing devices (including, for example, the first image capturing device 11 and the second image capturing device 12) have a depth-of-field (DOF) 5. That is, the images captured by the image capturing devices (including, for example, the first image capturing device 11 and the second image capturing device 12) are clear and identifiable when the target area is located inside or within the depth-of-field (DOF) 5. Such images may be transmitted to the controller 13 or other suitable analysis device. In one embodiment, the first image capturing device 11 has a first image capture direction 36. The first image capture direction 36 may be an optical axis of the lens of the first image capturing device 11. Further, the second image capturing device 12 has a second image capture direction 38. The second image capture direction 38 may be an optical axis of the lens of the second image capturing device 12. The intersection point "O" of the first image capture direction 36 and the second image capture direction 38 is located substantially at the center of the depth-of-field (DOF) 5. For an ideal situation, a portion 42 (e.g., the target area) to be measured of the workpiece 4 is located within the depth-of-field 5 of the image capturing devices (including, for example, the first image capturing device 11 and the second image capturing device 12), and the intersection point "O" of the first image capture direction 36 and the second image capture direction 38 is located at the top surface of the portion 42 to be measured of the workpiece 4. Thus, the images of the portion 42 of the workpiece 4 captured by the image capturing devices (including, for example, the first image capturing device 11 and the second image capturing device 12) are clear and identifiable.

As shown in the embodiment illustrated in FIG. 1 to FIG. 5, the controller 13 (e.g., a computer or a processor) is electrically connected to the main movement driving device 21, the first angle adjustment device 281, the second angle adjustment device 291, the first movement driving device 23, the second movement driving device 25 and the third movement driving device 27 of the adjustment apparatus 2 for controlling the locations and/or the orientations of the image capturing devices (including, for example, the first image capturing device 11 and the second image capturing device 12). Thus, the locations and/or the orientations of the image capturing devices (including, for example, the first image capturing device 11 and the second image capturing device 12) are controlled automatically rather than manually. As a result, less time is used in the measuring process, and the positioning of the image capturing devices (including, for example, the first image capturing device 11 and the second image capturing device 12) is very precise. In addition, since the workpiece 4 may be heated and cooled for just one time, the result of the measurement is accurate and reliable.

Figure 6:
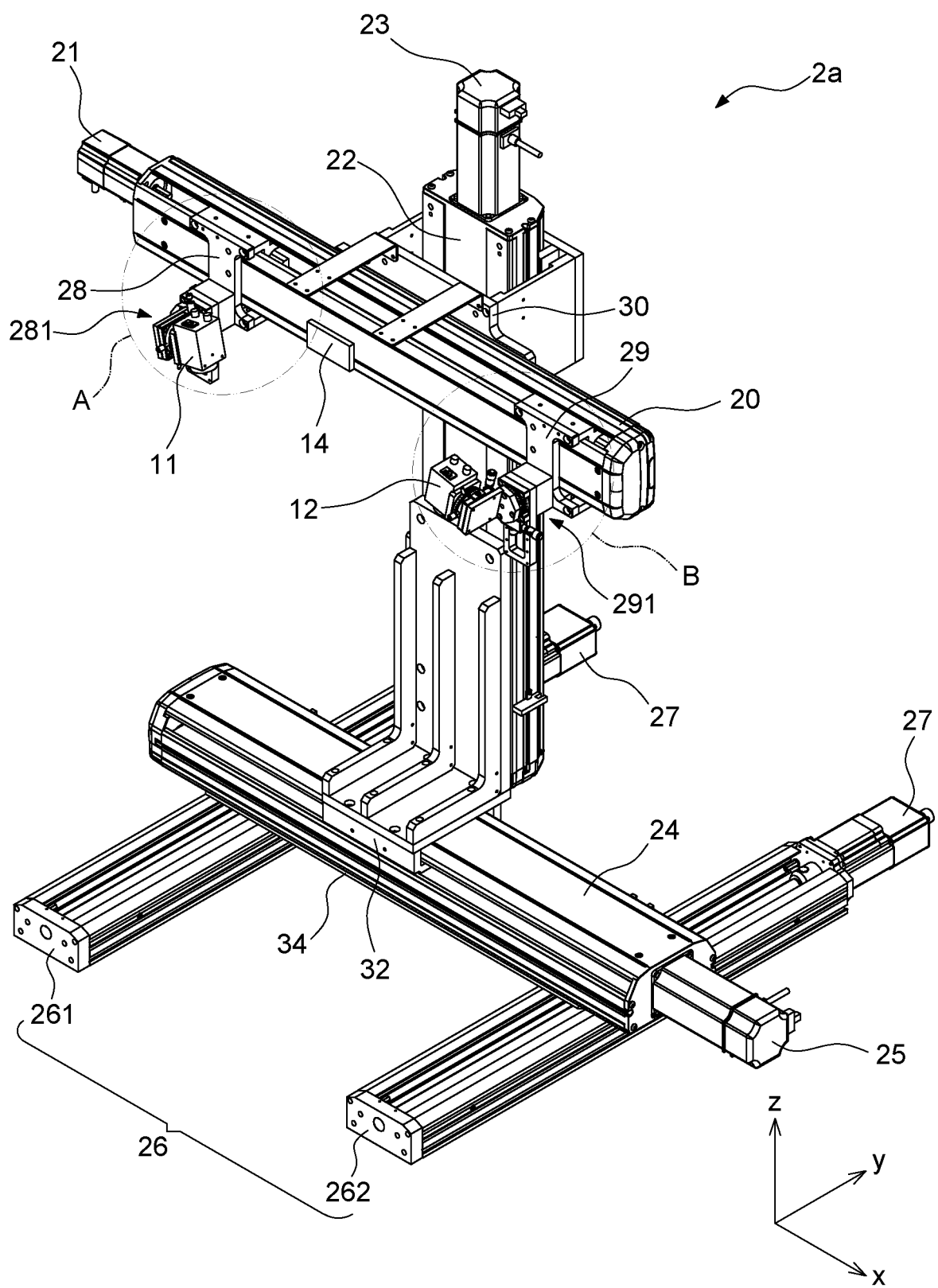
FIG. 6 illustrates a perspective view of an adjustment apparatus according to some embodiments of the present disclosure.
Figure 7:
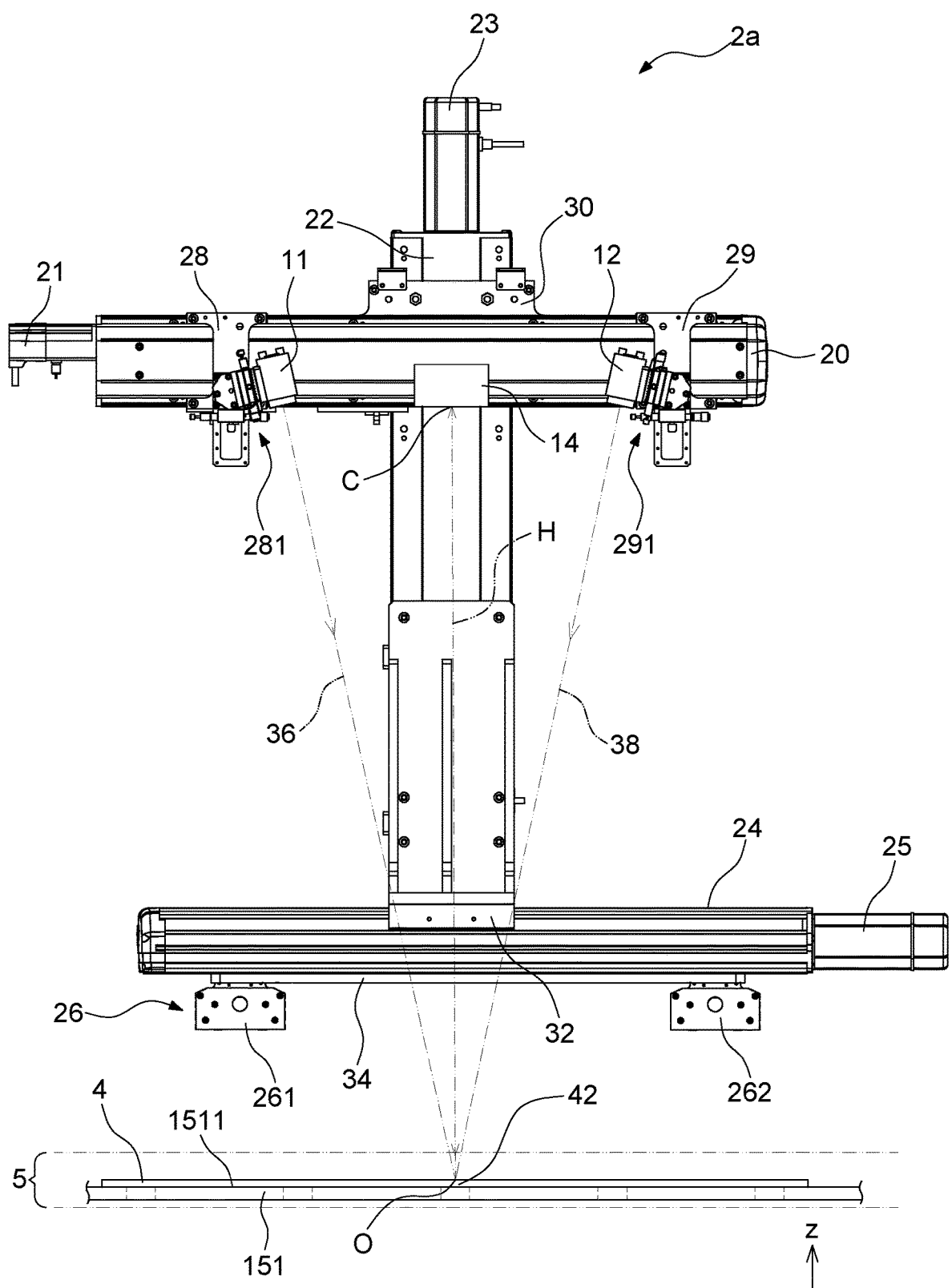
FIG. 7 illustrates a front view of the adjustment apparatus of FIG. 6 and a workpiece.

FIG. 6 illustrates a perspective view of an adjustment apparatus 2a according to some embodiments of the present disclosure. FIG. 7 illustrates a front view of the adjustment apparatus 2a of FIG. 6 and the workpiece 4. The adjustment apparatus 2a is similar to the adjustment apparatus 2 shown in FIG. 2 and FIG. 5, except that adjustment apparatus 2a further includes distance measuring apparatus 14. The distance measuring apparatus 14 is attached to the adjustment apparatus 2a for measuring a distance between the distance measuring apparatus 14 and the portion 42 to be measured of the workpiece 4. As shown in FIG. 2 and FIG. 5, the distance measuring apparatus 14 is disposed fixedly to a center portion of the holding structure 20. That is, the distance measuring apparatus 14 is disposed at the center point "C" of a gap between the image capturing devices (including, for example, the first image capturing device 11 and the second image capturing device 12). Thus, the distance measuring apparatus 14 may be used for measuring a distance "H" between the center of the image capturing devices (including, for example, the first image capturing device 11 and the second image capturing device 12) and the portion 42 to be measured of the workpiece 4. That is, the distance "H" is a distance between the center point "C" and the intersection point "O". The distance measuring apparatus 14 may be a laser distance measurement, an infrared distance measurement or an optical distance measurement (such a CCD camera). The distance measuring apparatus 14 may be also electrically connected to the controller 13. Thus, the locations and/or the orientations of the image capturing devices (including, for example, the first image capturing device 11 and the second image capturing device 12) are adjusted and controlled automatically by the adjustment apparatus 2 according to the measurement result from the distance measuring apparatus 14. That is, the controller 13 can be used for receiving the measured result from the distance measuring apparatus 14 to control the adjustment apparatus 2.

Figure 8:
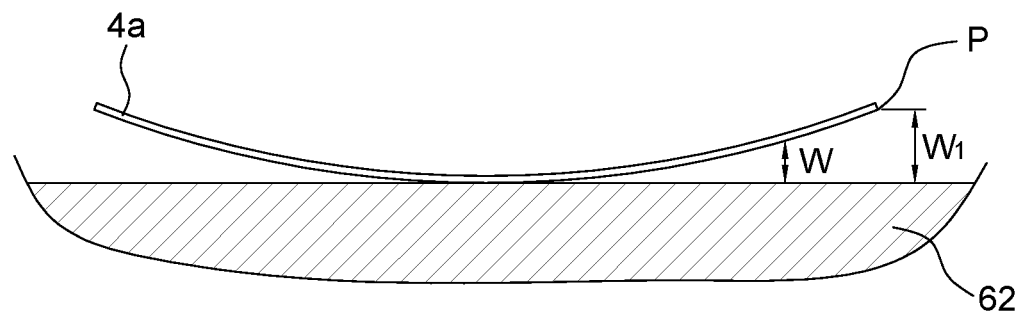
FIG. 8 illustrates one or more stages of an example of a method for measuring warpage of a workpiece according to some embodiments of the present disclosure.
Figure 9:
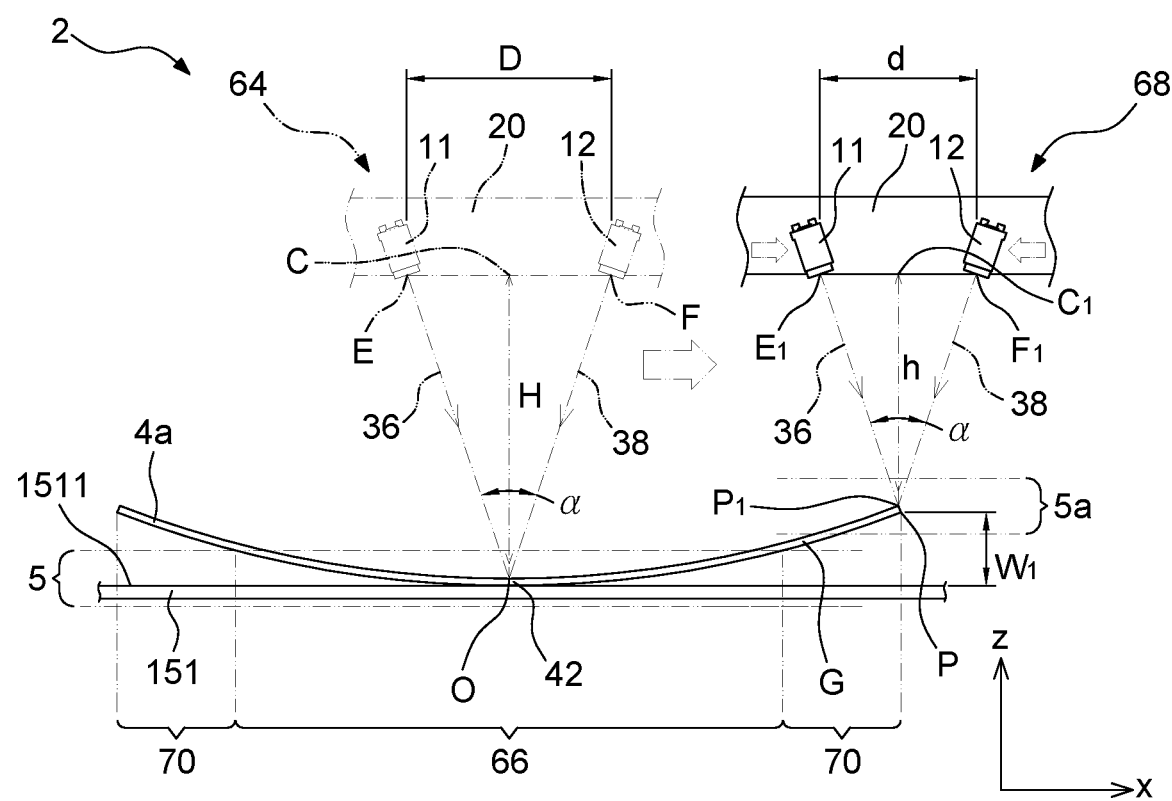
FIG. 9 illustrates one or more stages of an example of a method for measuring warpage of a workpiece according to some embodiments of the present disclosure.

FIG. 8 and FIG. 9 illustrate a method for measuring warpage of a workpiece according to some embodiments of the present disclosure. In some embodiments, the method may be accomplished by the adjustment apparatus 2 shown in FIG. 1 through FIG. 5. Referring to FIG. 8, a warped workpiece 4a is disposed on a measurement table 62 to measure a warpage of the workpiece 4a under a room temperature. As shown in FIG. 8, the warpage of the workpiece 4a is the "smile face (concave shape)" warpage, and the greatest warpage may occur at the periphery "P" of the workpiece 4a. The value of the warpage at any point of the workpiece 4a is measured to be W. In particular, the value of the greatest warpage at the periphery "P" of the workpiece 4a is measured to be $W_1$. For example, $W_1$ may be equal to 5 millimeters (mm).

Referring to FIG. 9, the workpiece 4a is disposed on a receiving surface 1511 of the receiving plate 151 of the oven 15 under at least two image capturing devices (including, for example, the first image capturing device 11 and the second image capturing device 12) of the adjustment apparatus 2. The image capturing devices (including, for example, the first image capturing device 11 and the second image capturing device 12) have a depth-of-field (DOF) 5 at a first position 64. The first position 64 may correspond to the central point of the workpiece 4a. The intersection point "O" of the first image capture direction 36 and the second image capture direction 38 may be located at the center of the top surface of the workpiece 4a. The first image capturing device 11 is disposed at point "E", and the second image capturing device 12 is disposed at point "F". The distance between the first image capturing device 11 (point "E") and the second image capturing device 12 (point "F") is defined as distance "D". The center of the distance (distance "D") between the first image capturing device 11 (point "E") and the second image capturing device 12 (point "F") is defined as point "C". The length of the segment CE is substantially equal to the length of the segment CF. The distance between the center point "C" and the intersection point "O" is defined as distance "H". For example, the distance "H" may be equal to 500 mm. The angle between the segment OE and the segment OF is defined as angle "α".

For the first position 64, the first image capturing device 11 and the second image capturing device 12 have a depth-of-field (DOF) 5, and the region 66 near the intersection point "O" is located within the depth-of-field (DOF) 5. Thus, the portion 42 to be measured of the workpiece 4a in the region 66 is located within the depth-of-field (DOF) 5, and the images captured by the first image capturing device 11 and the second image capturing device 12 in the region 66 are clear and identifiable. After such images are transmitted to the controller 13 or other suitable analysis device, the controller 13 or other suitable analysis device can determine the warpage condition of the workpiece 4a in the region 66 accurately.

Then, the first image capturing device 11 and the second image capturing device 12 are moved to the position corresponding to the region 70. The region 70 surrounds the region 66. For example, the first image capturing device 11 and the second image capturing device 12 are moved simultaneously to the second position 68 above the periphery "P" of the workpiece 4a in a second direction (x-axis direction). The second direction (x-axis direction) is substantially perpendicular to a normal direction (z-axis direction) of the receiving surface 1511. That is, the second direction (x-axis direction) is substantially parallel with the receiving surface 1511. As shown in FIG. 9, the portion to be measured of the workpiece 4a in the region 70 is located outside the depth-of-field (DOF) 5. That is, the portion to be measured of the workpiece 4a in the region 70 is located above the depth-of-field (DOF) 5. Thus, if the relative position of the first image capturing device 11 and the second image capturing device 12 are not adjusted, images captured by the first image capturing device 11 and the second image capturing device 12 in the region 70 will be not clear and identifiable (which is referred to as "graphic glitch"), and the warpage degree of the workpiece 4a in the region 70 cannot be measured or detected.

The solution illustrated in FIG. 9 is described as follows. Taking the second position 68 for example, the first image capturing device 11 and the second image capturing device 12 are further moved simultaneously but in opposite directions. Specifically, the first image capturing device 11 is further removed to right slightly, and the second image capturing device 12 is further removed to left slightly. Thus, the intersection point "$P_1$" of the first image capture direction 36 and the second image capture direction 38 may be located at the edge of the top surface of the workpiece 4a opposite to the periphery "P". The first image capturing device 11 is disposed at point "$E_1$", and the second image capturing device 12 is disposed at point "$F_1$". The distance between the first image capturing device 11 (point "$E_1$") and the second image capturing device 12 (point "$F_1$") is defined as distance "d". The center of the distance (distance "d") between the first image capturing device 11 (point "$E_1$") and the second image capturing device 12 (point "$F_1$") is defined as point "$C_1$". The length of the segment $C_1E_1$ is substantially equal to the length of the segment $C_1F_1$. The distance between the center point "$C_1$" and the intersection point "$P_1$" is defined as distance "h". For example, the distance "h" may be equal to 495 mm. The angle between the segment $P_1E_1$ and the segment $P_1F_1$ is still equal to angle "α".

For the second position 68, the first image capturing device 11 and the second image capturing device 12 have a depth-of-field (DOF) 5a, and the region 70 near the intersection point "$P_1$" is located within the depth-of-field (DOF) 5a. Thus, the portion to be measured of the workpiece 4a in the region 70 near the intersection point "$P_1$" is located within the depth-of-field (DOF) 5a, and the images captured by the first image capturing device 11 and the second image capturing device 12 in the region 70 near the intersection point "$P_1$" are clear and identifiable. After such images are transmitted to the controller 13 or other suitable analysis device, the controller 13 or other suitable analysis device can determine the warpage condition of the workpiece 4a in the region 70 near the intersection point "$P_1$" accurately. Thus, "graphic glitch" will not happen.

It is noted that the distance "h" is determined by subtracting the measured result (the value W of the warpage of the workpiece 4a) of FIG. 8 from the distance "H". That is, h=H−W. At the second position 68, h=H−$W_1$=500 mm−5 mm=495 mm. In addition, the distance "d" is determined as follows.

$$\text{In triangle } OCE, \tan\frac{\alpha}{2} = \frac{D}{2 \cdot H}$$

$$\text{In triangle } P_1C_1E_1, \tan\frac{\alpha}{2} = \frac{d}{2 \cdot h}$$

$$\text{Thus, } \tan\frac{\alpha}{2} = \frac{D}{2 \cdot H} = \frac{d}{2 \cdot h}$$

$$d = \frac{D \cdot h}{H}$$

$$\text{At the second position 68, } d = \frac{D \cdot h}{H} = \frac{D \cdot 495}{500} = 0.99D$$

Further, if the workpiece 4a is heated or cooled by the oven 15, the warpage condition of the workpiece 4a may be changed. Thus, the value $W_1$ of the warpage of the workpiece 4a may be increased or decreased. However, meanwhile, the portion to be measured of the workpiece 4a in the region 70 near the intersection point "$P_1$" may be still located within the depth-of-field (DOF) 5a, and the images captured by the first image capturing device 11 and the second image capturing device 12 in the region 70 near the intersection point "$P_1$" are still clear and identifiable. It is understood that the other point of the workpiece 4a, such as point G, may be measured as the method described above. As a result, all portions to be measured of the workpiece 4a is located within the depth-of-field of the image capturing devices (e.g., the first image capturing device 11 and the second image capturing device 12) within a range of a temperature variation, and the warpage condition of the entire workpiece 4a can be measured accurately and quickly.

Figure 10:
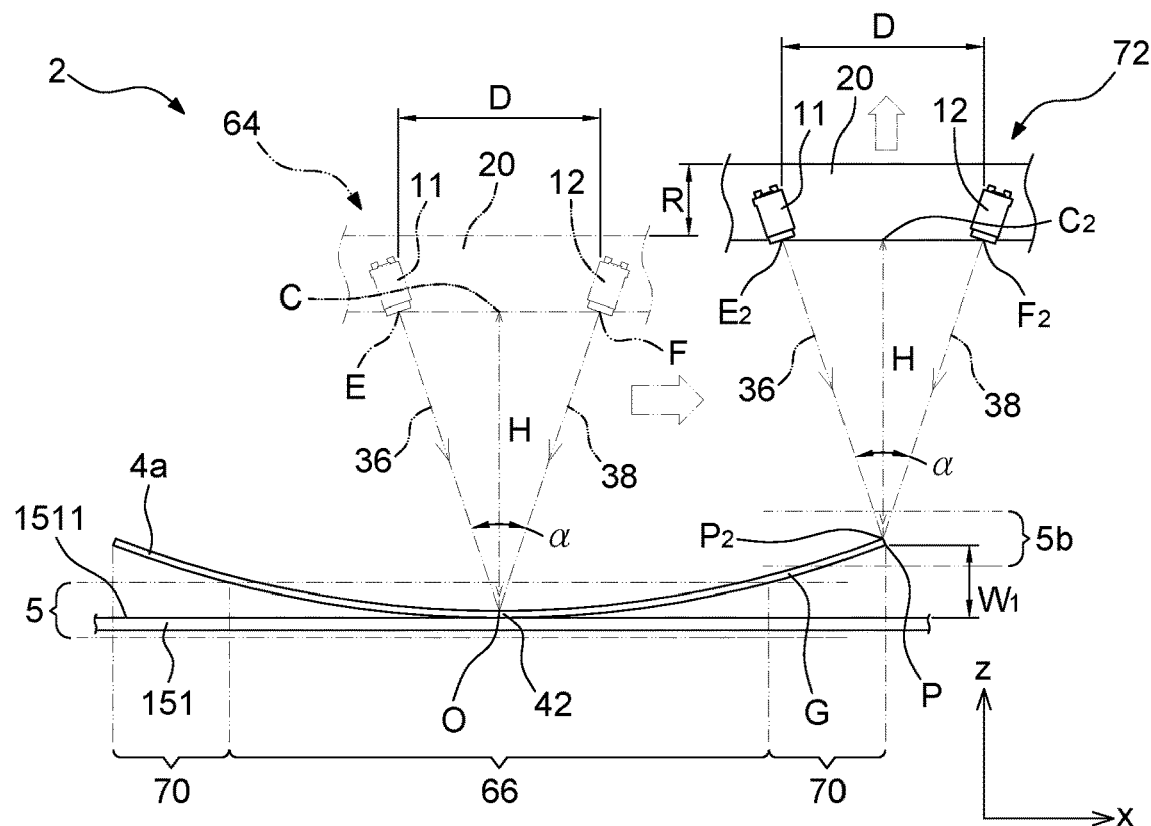
FIG. 10 illustrates one or more stages of an example of a method for measuring warpage of a workpiece according to some embodiments of the present disclosure.

FIG. 10 illustrates a method for measuring warpage of a workpiece according to some embodiments of the present disclosure. In some embodiments, the method may be accomplished by the adjustment apparatus 2 shown in FIG. 1 through FIG. 5, and the method is used to measure the warped workpiece 4a of FIG. 8. Referring to FIG. 10, the workpiece 4a is disposed on a receiving surface 1511 of the receiving plate 151 of the oven 15 under at least two image capturing devices (including, for example, the first image capturing device 11 and the second image capturing device 12) of the adjustment apparatus 2. The image capturing devices (including, for example, the first image capturing device 11 and the second image capturing device 12) have a depth-of-field (DOF) 5 at a first position 64. The first position 64 may correspond to the central point of the workpiece 4a. The triangle OEF at the first position 64 of FIG. 10 is the same as the triangle OEF at the first position 64 of FIG. 9.

Then, the first image capturing device 11 and the second image capturing device 12 are moved to the position corresponding to the region 70. For example, the first image capturing device 11 and the second image capturing device 12 are moved simultaneously to the third position 72 above the periphery "P" of the workpiece 4a in a second direction (x-axis direction). Then, the holding structure 20 (accompanying with the first image capturing device 11 and the second image capturing device 12) is moved upward along the first guide structure 22 in a first direction (z-axis direction) for a distance "R". The distance "R" is substantially equal to the measured result (the value $W_1$ of the warpage of the workpiece 4a) of FIG. 8. Specifically, the first image capturing device 11 and the second image capturing device 12 are further removed upward slightly for the distance "R". Thus, the intersection point "$P_2$" of the first image capture direction 36 and the second image capture direction 38 may be located at the edge of the top surface of the workpiece 4a opposite to the periphery "P". The first image capturing device 11 is disposed at point "$E_2$", and the second image capturing device 12 is disposed at point "$F_2$". The distance between the first image capturing device 11 (point "$E_2$") and the second image capturing device 12 (point "$F_2$") is still the distance "D". The center of the distance (distance "D") between the first image capturing device 11 (point "$E_2$") and the second image capturing device 12 (point "$F_2$") is defined as point "$C_2$". The distance between the center point "$C_2$" and the intersection point "$P_2$" is still the distance "H". The angle between the segment $P_2E_2$ and the segment $P_2F_2$ is still equal to angle "a". It is noted that the triangle $P_2E_2F_2$ is equal to the triangle OEF.

For the third position 72, the first image capturing device 11 and the second image capturing device 12 have a depth-of-field (DOF) 5b, and the region 70 near the intersection point "P₂" is located within the depth-of-field (DOF) 5b. Thus, the portion to be measured of the workpiece 4a in the region 70 near the intersection point "P₂" is located within the depth-of-field (DOF) 5b, and the images captured by the first image capturing device 11 and the second image capturing device 12 in the region 70 near the intersection point "P₂" are clear and identifiable. After such images are transmitted to the controller 13 or other suitable analysis device, the controller 13 or other suitable analysis device can determine the warpage condition of the workpiece 4a in the region 70 near the intersection point "P₂" accurately. Thus, "graphic glitch" will not happen.

Further, if the workpiece 4a is heated or cooled by the oven 15, the warpage condition of the workpiece 4a may be changed. Thus, the value $W_1$ of the warpage of the workpiece 4a may be increased or decreased. However, meanwhile, the portion to be measured of the workpiece 4a in the region 70 near the intersection point "P₂" may be still located within the depth-of-field (DOF) 5b, and the images captured by the first image capturing device 11 and the second image capturing device 12 in the region 70 near the intersection point "P₂" are still clear and identifiable. It is understood that the other point of the workpiece 4a, such as point G, may be measured as the method described above. As a result, all portions to be measured of the workpiece 4a is located within the depth-of-field of the image capturing devices (e.g., the first image capturing device 11 and the second image capturing device 12) within a range of a temperature variation, and the warpage condition of the entire workpiece 4a can be measured accurately and quickly.

Figure 11:
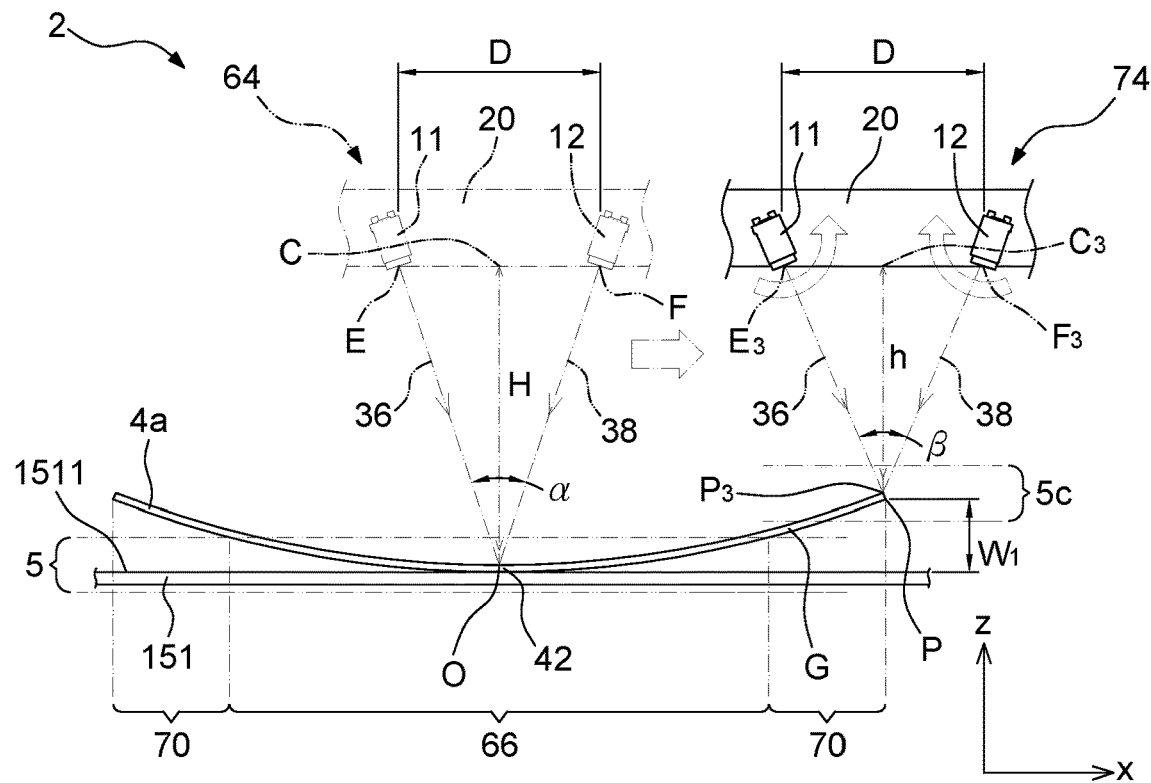
FIG. 11 illustrates one or more stages of an example of a method for measuring warpage of a workpiece according to some embodiments of the present disclosure.

FIG. 11 illustrates a method for measuring warpage of a workpiece according to some embodiments of the present disclosure. In some embodiments, the method may be accomplished by the adjustment apparatus 2 shown in FIG. 1 through FIG. 5, and the method is used to measure the warped workpiece 4a of FIG. 8. Referring to FIG. 11, the workpiece 4a is disposed on a receiving surface 1511 of the receiving plate 151 of the oven 15 under at least two image capturing devices (including, for example, the first image capturing device 11 and the second image capturing device 12) of the adjustment apparatus 2. The image capturing devices (including, for example, the first image capturing device 11 and the second image capturing device 12) have a depth-of-field (DOF) 5 at a first position 64. The first position 64 may correspond to the central point of the workpiece 4a. The triangle OEF at the first position 64 of FIG. 11 is the same as the triangle OEF at the first position 64 of FIG. 9.

Then, the first image capturing device 11 and the second image capturing device 12 are moved to the position corresponding to the region 70. For example, the first image capturing device 11 and the second image capturing device 12 are moved simultaneously to the fourth position 74 above the periphery "P" of the workpiece 4a in a second direction (x-axis direction). Then, the first image capturing device 11 and the second image capturing device 12 are rotated. Specifically, the first image capturing device 11 is rotated counterclockwise, and the second image capturing device 12 is rotated clockwise. Thus, the intersection point "P₃" of the first image capture direction 36 and the second image capture direction 38 may be located at the edge of the top surface of the workpiece 4a opposite to the periphery "P". The first image capturing device 11 is disposed at point "E₃", and the second image capturing device 12 is disposed at point "F₃". The distance between the first image capturing device 11 (point "E₃") and the second image capturing device 12 (point "F₃") is still the distance "D". The center of the distance (distance "D") between the first image capturing device 11 (point "E₃") and the second image capturing device 12 (point "F₃") is defined as point "C₃". The distance between the center point "C₃" and the intersection point "P₃" is defined as the distance "h". As stated above, h=H−W₁=500 mm-5 mm=495 mm. The angle between the segment P₃E₃ and the segment P₃F₃ is defined as angle "β". It is noted that the angle "β" is greater than the angle "α". The relationship between the angle "β" and the angle "α" is determined as follows.

$$\text{In triangle } OCE,\ \tan\frac{\alpha}{2} = \frac{D}{2 \cdot H}$$

$$\text{In triangle } P_3C_3E_3,\ \tan\frac{\beta}{2} = \frac{D}{2 \cdot h}$$

$$\text{Thus, } D = 2 \cdot h \cdot \tan\frac{\beta}{2} = 2 \cdot H \cdot \tan\frac{\alpha}{2}$$

$$\text{As a result, } \beta = 2 \cdot \tan^{-1}\left(\frac{H}{h} \cdot \tan\frac{\alpha}{2}\right)$$

For the fourth position 74, the first image capturing device 11 and the second image capturing device 12 have a depth-of-field (DOF) 5c, and the region 70 near the intersection point "P₃" is located within the depth-of-field (DOF) 5c. Thus, the portion to be measured of the workpiece 4a in the region 70 near the intersection point "P₃" is located within the depth-of-field (DOF) 5c, and the images captured by the first image capturing device 11 and the second image capturing device 12 in the region 70 near the intersection point "P₃" are clear and identifiable. After such images are transmitted to the controller 13 or other suitable analysis device, the controller 13 or other suitable analysis device can determine the warpage condition of the workpiece 4a in the region 70 near the intersection point "P₃" accurately. Thus, "graphic glitch" will not happen.

Further, if the workpiece 4a is heated or cooled by the oven 15, the warpage condition of the workpiece 4a may be changed. Thus, the value $W_1$ of the warpage of the workpiece 4a may be increased or decreased. However, meanwhile, the portion to be measured of the workpiece 4a in the region 70 near the intersection point "P₃" may be still located within the depth-of-field (DOF) 5c, and the images captured by the first image capturing device 11 and the second image capturing device 12 in the region 70 near the intersection point "P₃" are still clear and identifiable. It is understood that the other point of the workpiece 4a, such as point G, may be measured as the method described above. As a result, all portions to be measured of the workpiece 4a is located within the depth-of-field of the image capturing devices (e.g., the first image capturing device 11 and the second image capturing device 12) within a range of a temperature variation, and the warpage condition of the entire workpiece 4a can be measured accurately and quickly.

Figure 12:
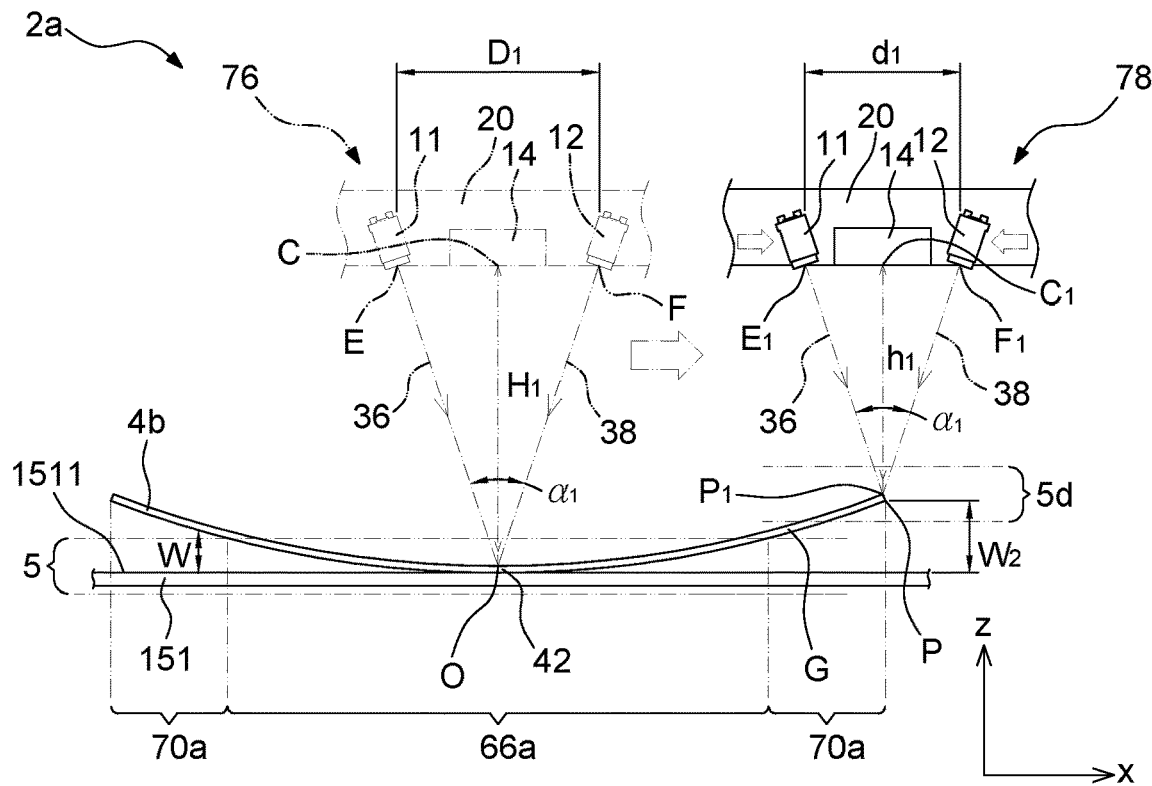
FIG. 12 illustrates one or more stages of an example of a method for measuring warpage of a workpiece according to some embodiments of the present disclosure.

FIG. 12 illustrates a method for measuring warpage of a workpiece according to some embodiments of the present disclosure. In some embodiments, the method may be accomplished by the adjustment apparatus 2a shown in FIG. 6 and FIG. 7. Referring to FIG. 12, a workpiece 4b is disposed directly on a receiving surface 1511 of the receiving plate 151 of the oven 15 under at least two image capturing devices (including, for example, the first image capturing device 11 and the second image capturing device 12) of the adjustment apparatus 2a. Then, the workpiece 4b is heated by the oven 15, and warpage may occur. The image capturing devices (including, for example, the first image capturing device 11 and the second image capturing device 12) have a depth-of-field (DOF) 5 at a first position 76. The first position 76 may correspond to the central point of the workpiece 4b. The intersection point "O" of the first image capture direction 36 and the second image capture direction 38 may be located at the center of the top surface of the workpiece 4b. The first image capturing device 11 is disposed at point "E", and the second image capturing device 12 is disposed at point "F". The distance between the first image capturing device 11 (point "E") and the second image capturing device 12 (point "F") is defined as distance "$D_1$". The center of the distance (distance "$D_1$") between the first image capturing device 11 (point "E") and the second image capturing device 12 (point "F") is defined as point "C". The distance measuring apparatus 14 is disposed at the point "C". The length of the segment CE is substantially equal to the length of the segment CF. The distance between the center point "C" and the intersection point "O" is defined as distance "$H_1$". For example, the distance "$H_1$" may be equal to 500 mm. The angle between the segment OE and the segment OF is defined as angle "α".

For the first position 76, the first image capturing device 11 and the second image capturing device 12 have a depth-of-field (DOF) 5, and the region 66a near the intersection point "O" is located within the depth-of-field (DOF) 5. Thus, the portion 42 to be measured of the workpiece 4b in the region 66a is located within the depth-of-field (DOF) 5, and the images captured by the first image capturing device 11 and the second image capturing device 12 in the region 66a are clear and identifiable. After such images are transmitted to the controller 13 or other suitable analysis device, the controller 13 or other suitable analysis device can determine the warpage condition of the workpiece 4b in the region 66a accurately.

Then, the first image capturing device 11 and the second image capturing device 12 are moved to the position corresponding to the region 70a. The region 70a surrounds the region 66a. For example, the first image capturing device 11 and the second image capturing device 12 are moved simultaneously to the second position 78 above the periphery "P" of the workpiece 4b in a second direction (x-axis direction). As shown in FIG. 12, the portion to be measured of the workpiece 4b in the region 70a is located outside the depth-of-field (DOF) 5. That is, the portion to be measured of the workpiece 4b in the region 70a is located above the depth-of-field (DOF) 5. The solution illustrated in FIG. 12 is described as follows. Taking the second position 78 for example, the first image capturing device 11 and the second image capturing device 12 are further moved simultaneously but in opposite directions. Specifically, the first image capturing device 11 is further removed to right slightly, and the second image capturing device 12 is further removed to left slightly. Thus, the intersection point "$P_1$" of the first image capture direction 36 and the second image capture direction 38 may be located at the edge of the top surface of the workpiece 4b opposite to the periphery "P". The first image capturing device 11 is disposed at point "$E_1$", and the second image capturing device 12 is disposed at point "$F_1$". The distance between the first image capturing device 11 (point "$E_1$") and the second image capturing device 12 (point "$F_1$") is defined as distance "$d_1$". The center of the distance (distance "$d_1$") between the first image capturing device 11 (point "$E_1$") and the second image capturing device 12 (point "$F_1$") is defined as point "$C_1$". The length of the segment $C_1E_1$ is substantially equal to the length of the segment $C_1F_1$. The distance between the center point "$C_1$" and the intersection point "$P_1$" is defined as distance "$h_1$". For example, the warpage of the workpiece 4b is the "smile face (concave shape)" warpage, and the greatest warpage may occur at the periphery "P" of the workpiece 4b. The value W of the warpage at any point of the workpiece 4b is measured by the distance measuring apparatus 14. In particular, the value of the greatest warpage at the periphery "P" of the workpiece 4b is measured to be $W_2$. For example, $W_2$ may be equal to 5 mm. The distance "$h_1$" may be equal to 495 mm. The angle between the segment $P_1E_1$ and the segment $P_1F_1$ is defined as angle "$α_1$".

For the second position 78, the first image capturing device 11 and the second image capturing device 12 have a depth-of-field (DOF) 5d, and the region 70a near the intersection point "$P_1$" is located within the depth-of-field (DOF) 5d. Thus, the portion to be measured of the workpiece 4b in the region 70a near the intersection point "$P_1$" is located within the depth-of-field (DOF) 5d, and the images captured by the first image capturing device 11 and the second image capturing device 12 in the region 70a near the intersection point "$P_1$" are clear and identifiable. After such images are transmitted to the controller 13 or other suitable analysis device, the controller 13 or other suitable analysis device can determine the warpage condition of the workpiece 4d in the region 70a near the intersection point "$P_1$" accurately. Thus, "graphic glitch" will not happen.

It is noted that the distance "$h_1$" is determined by subtracting the measured result (the value W of the warpage of the workpiece 4b measured by the distance measuring apparatus 14) from the distance "$H_1$". That is, $h_1=H_1-W$. At the second position 78, $h_1=H_1-W_2=500$ mm-5 mm=495 mm. In addition, the distance "$d_1$" is determined as follows.

$$\text{In triangle } OCE, \tan\frac{\alpha_1}{2} = \frac{D_1}{2 \cdot H_1}$$

$$\text{In triangle } P_1C_1E_1, \tan\frac{\alpha_1}{2} = \frac{d_1}{2 \cdot h_1}$$

$$\text{Thus, } \tan\frac{\alpha_1}{2} = \frac{D_1}{2 \cdot H_1} = \frac{d_1}{2 \cdot h_1}$$

$$d_1 = \frac{D_1 \cdot h_1}{H_1}$$

$$\text{At the second position 78, } d_1 = \frac{D_1 \cdot h_1}{H_1} = \frac{D_1 \cdot 495}{500} = 0.99 D_1$$

Further, if the workpiece 4b is further heated or cooled by the oven 15, the warpage condition of the workpiece 4b may be changed. Thus, the value W, $W_2$ of the warpage of the workpiece 4b may be increased or decreased. However, the value W, $W_2$ of the warpage of the workpiece 4b may be measured by the distance measuring apparatus 14 instantaneously and transmitted to the controller 13. Thus, the controller 13 can adjust the locations and/or orientations of the image capturing devices (e.g., the first image capturing device 11 and the second image capturing device 12) automatically. As a result, all portions to be measured of the workpiece 4b is located within the depth-of-field of the image capturing devices (e.g., the first image capturing device 11 and the second image capturing device 12) within a range of a temperature variation, and the warpage condition of the entire workpiece 4b can be measured accurately and quickly.

Figure 13:
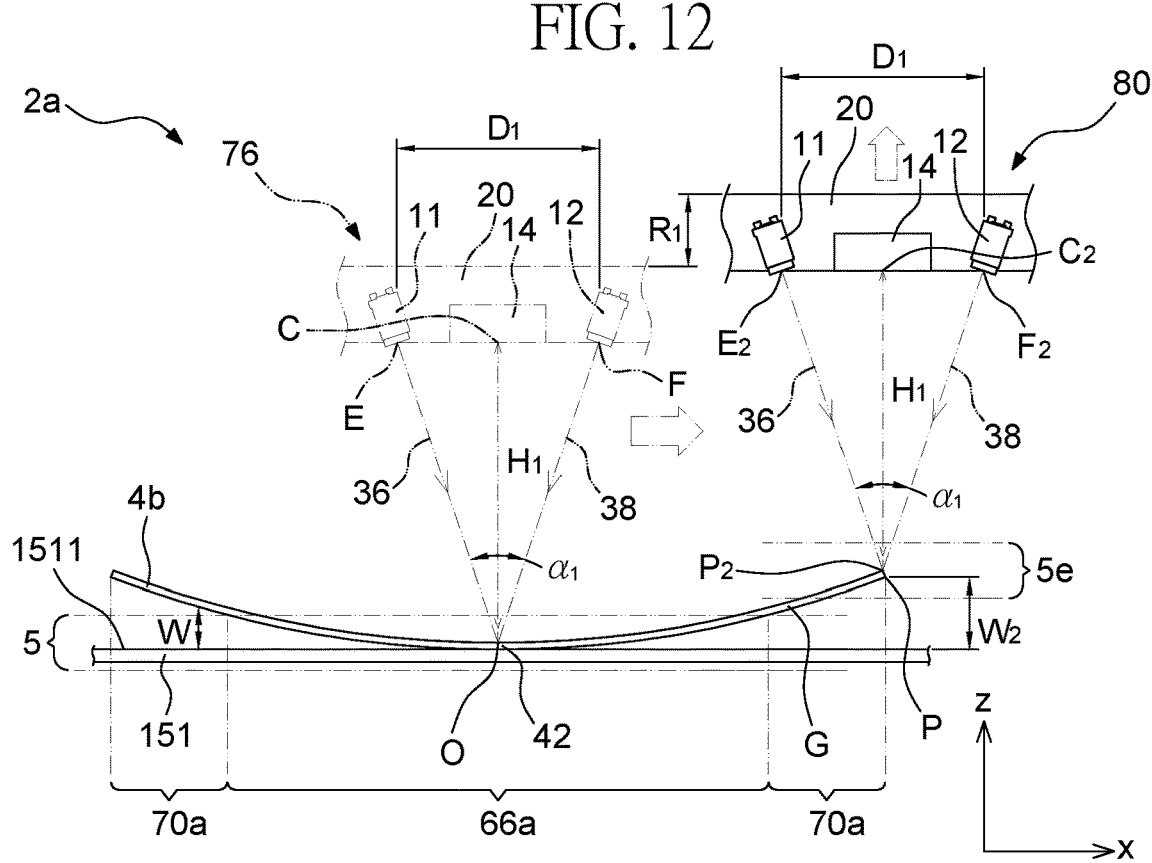
FIG. 13 illustrates one or more stages of an example of a method for measuring warpage of a workpiece according to some embodiments of the present disclosure.

FIG. 13 illustrates a method for measuring warpage of a workpiece according to some embodiments of the present disclosure. In some embodiments, the method may be accomplished by the adjustment apparatus 2a shown in FIG. 6 and FIG. 7, and the method is used to measure the warped workpiece 4b. Referring to FIG. 13, a workpiece 4b is disposed directly on a receiving surface 1511 of the receiving plate 151 of the oven 15 under at least two image capturing devices (including, for example, the first image capturing device 11 and the second image capturing device 12) of the adjustment apparatus 2a. Then, the workpiece 4b is heated by the oven 15, and warpage may occur. The image capturing devices (including, for example, the first image capturing device 11 and the second image capturing device 12) have a depth-of-field (DOF) 5 at a first position 76. The first position 76 may correspond to the region 66a of the workpiece 4b. The triangle OEF at the first position 76 of FIG. 13 is the same as the triangle OEF at the first position 76 of FIG. 12.

Then, the first image capturing device 11 and the second image capturing device 12 are moved to the position corresponding to the region 70a. For example, the first image capturing device 11 and the second image capturing device 12 are moved simultaneously to the third position 80 above the periphery "P" of the workpiece 4b in a second direction (x-axis direction). Then, the holding structure 20 (accompanying with the first image capturing device 11 and the second image capturing device 12) is moved upward along the first guide structure 22 in a first direction (z-axis direction) for a distance "$R_1$". The distance "$R_1$" is substantially equal to the measured result (e.g., the value $W_2$ of the warpage of the workpiece 4b) measured by the distance measuring apparatus 14. Specifically, the first image capturing device 11 and the second image capturing device 12 are further removed upward slightly for the distance "$R_1$". Thus, the intersection point "$P_2$" of the first image capture direction 36 and the second image capture direction 38 may be located at the edge of the top surface of the workpiece 4b opposite to the periphery "P". The first image capturing device 11 is disposed at point "$E_2$", and the second image capturing device 12 is disposed at point "$F_2$". The distance between the first image capturing device 11 (point "$E_2$") and the second image capturing device 12 (point "$F_2$") is still the distance "$D_1$". The center of the distance (distance "$D_1$") between the first image capturing device 11 (point "$E_2$") and the second image capturing device 12 (point "$F_2$") is defined as point "$C_2$". The distance between the center point "$C_2$" and the intersection point "$P_2$" is still the distance "$H_1$". The angle between the segment $P_2E_2$ and the segment $P_2F_2$ is still equal to angle "$\alpha_1$". It is noted that the triangle $P_2E_2F_2$ is equal to the triangle OEF.

For the third position 80, the first image capturing device 11 and the second image capturing device 12 have a depth-of-field (DOF) 5e, and the region 70a near the intersection point "$P_2$" is located within the depth-of-field (DOF) 5e. Thus, the portion to be measured of the workpiece 4b in the region 70a near the intersection point "$P_2$" is located within the depth-of-field (DOF) 5e, and the images captured by the first image capturing device 11 and the second image capturing device 12 in the region 70a near the intersection point "$P_2$" are clear and identifiable. After such images are transmitted to the controller 13 or other suitable analysis device, the controller 13 or other suitable analysis device can determine the warpage condition of the workpiece 4b in the region 70a near the intersection point "$P_2$" accurately. Thus, "graphic glitch" will not happen.

Further, if the workpiece 4b is further heated or cooled by the oven 15, the warpage condition of the workpiece 4b may be changed. Thus, the value W, $W_2$ of the warpage of the workpiece 4b may be increased or decreased. However, the value W, $W_2$ of the warpage of the workpiece 4b may be measured by the distance measuring apparatus 14 instantaneously and transmitted to the controller 13. Thus, the controller 13 can adjust the locations and/or orientations of the image capturing devices (e.g., the first image capturing device 11 and the second image capturing device 12) automatically. As a result, all portions to be measured of the workpiece 4b is located within the depth-of-field of the image capturing devices (e.g., the first image capturing device 11 and the second image capturing device 12) within a range of a temperature variation, and the warpage condition of the entire workpiece 4b can be measured accurately and quickly.

Figure 14:
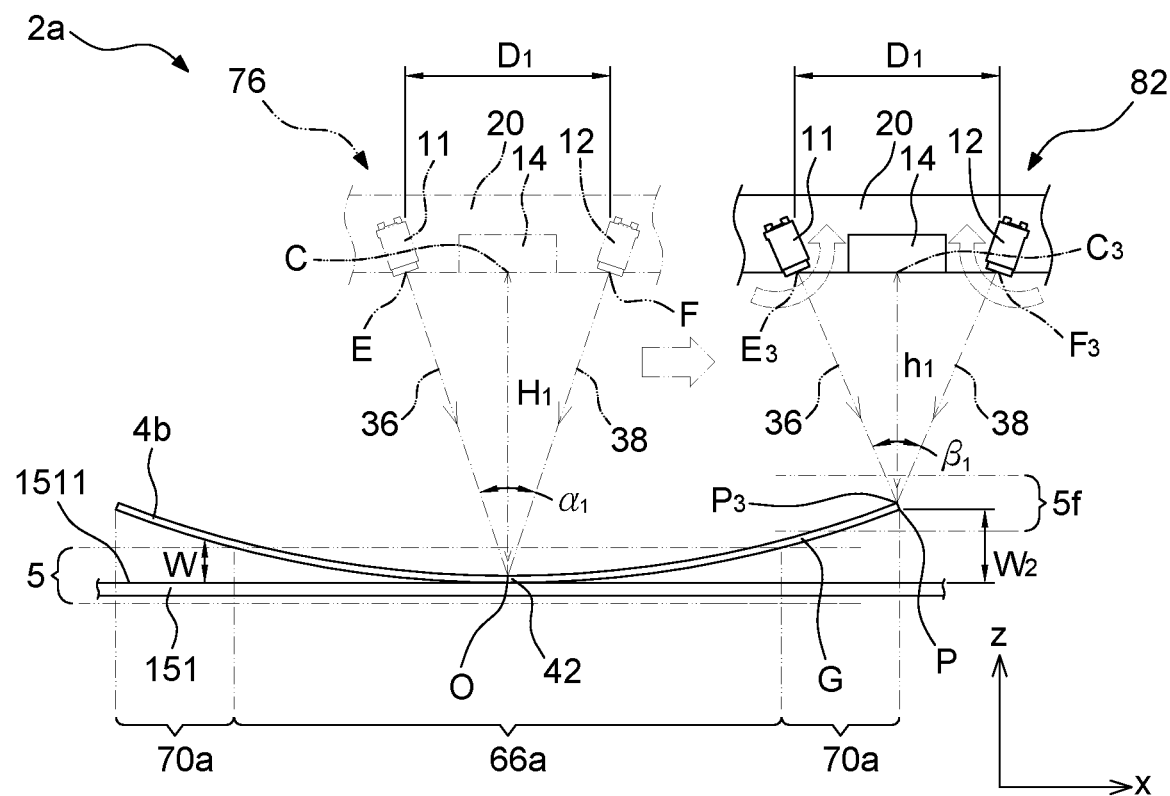
FIG. 14 illustrates one or more stages of an example of a method for measuring warpage of a workpiece according to some embodiments of the present disclosure.

FIG. 14 illustrates a method for measuring warpage of a workpiece according to some embodiments of the present disclosure. In some embodiments, the method may be accomplished by the adjustment apparatus 2a shown in FIG. 6 and FIG. 4, and the method is used to measure the warped workpiece 4b. Referring to FIG. 14, a workpiece 4b is disposed directly on a receiving surface 1511 of the receiving plate 151 of the oven 15 under at least two image capturing devices (including, for example, the first image capturing device 11 and the second image capturing device 12) of the adjustment apparatus 2a. Then, the workpiece 4b is heated by the oven 15, and warpage may occur. The image capturing devices (including, for example, the first image capturing device 11 and the second image capturing device 12) have a depth-of-field (DOF) 5 at a first position 76. The first position 76 may correspond to the region 66a of the workpiece 4b. The triangle OEF at the first position 76 of FIG. 14 is the same as the triangle OEF at the first position 76 of FIG. 12.

Then, the first image capturing device 11 and the second image capturing device 12 are moved to the position corresponding to the region 70a. For example, the first image capturing device 11 and the second image capturing device 12 are moved simultaneously to the fourth position 82 above the periphery "P" of the workpiece 4b in a second direction (x-axis direction). Then, the first image capturing device 11 and the second image capturing device 12 are rotated. Specifically, the first image capturing device 11 is rotated counterclockwise, and the second image capturing device 12 is rotated clockwise. Thus, the intersection point "$P_3$" of the first image capture direction 36 and the second image capture direction 38 may be located at the edge of the top surface of the workpiece 4b opposite to the periphery "P". The first image capturing device 11 is disposed at point "$E_3$", and the second image capturing device 12 is disposed at point "$F_3$". The distance between the first image capturing device 11 (point "$E_3$") and the second image capturing device 12 (point "$F_3$") is still the distance "$D_1$". The center of the distance (distance "$D_1$") between the first image capturing device 11 (point "$E_3$") and the second image capturing device 12 (point "$F_3$") is defined as point "$C_3$". The distance between the center point "$C_3$" and the intersection point "$P_3$" is defined as the distance "$h_1$". As stated above, $h_1 = H_1 - W_2 = 500$ mm-5 mm=495 mm. The angle between the segment $P_3E_3$ and the segment $P_3F_3$ is defined as angle "$\beta_1$". It is noted that the angle "$\beta_1$" is greater than the angle "$\alpha_1$". The relationship between the angle "$\beta_1$" and the angle "$\alpha_1$" is determined as follows.

In triangle $OCE$, $\tan\frac{\alpha_1}{2} = \frac{D_1}{2 \cdot H_1}$

In triangle $P_3C_3E_3$, $\tan\frac{\beta_1}{2} = \frac{D_1}{2 \cdot h_1}$

Thus, $D_1 = 2 \cdot h_1 \cdot \tan\frac{\beta_1}{2} = 2 \cdot H_1 \cdot \tan\frac{\alpha_1}{2}$ As a result, $\beta_1 = 2 \cdot \tan^{-1}\left(\frac{H_1}{h_1} \cdot \tan\frac{\alpha_1}{2}\right)$ For the fourth position 82, the first image capturing device 11 and the second image capturing device 12 have a depth-of-field (DOF) 5f, and the region 70a near the intersection point "P₃" is located within the depth-of-field (DOF) 5f. Thus, the portion to be measured of the workpiece 4b in the region 70a near the intersection point "P₃" is located within the depth-of-field (DOF) 5f, and the images captured by the first image capturing device 11 and the second image capturing device 12 in the region 70a near the intersection point "P₃" are clear and identifiable. After such images are transmitted to the controller 13 or other suitable analysis device, the controller 13 or other suitable analysis device can determine the warpage condition of the workpiece 4b in the region 70a near the intersection point "P₃" accurately. Thus, "graphic glitch" will not happen.

Further, if the workpiece 4b is further heated or cooled by the oven 15, the warpage condition of the workpiece 4b may be changed. Thus, the value W, W₂ of the warpage of the workpiece 4b may be increased or decreased. However, the value W, W₂ of the warpage of the workpiece 4b may be measured by the distance measuring apparatus 14 instantaneously and transmitted to the controller 13. Thus, the controller 13 can adjust the locations and/or orientations of the image capturing devices (e.g., the first image capturing device 11 and the second image capturing device 12) automatically. As a result, all portions to be measured of the workpiece 4b is located within the depth-of-field of the image capturing devices (e.g., the first image capturing device 11 and the second image capturing device 12) within a range of a temperature variation, and the warpage condition of the entire workpiece 4b can be measured accurately and quickly.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such an arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Two surfaces can be deemed to be coplanar or substantially coplanar if a displacement between the two surfaces is no greater than 5 μm, no greater than 2 μm, no greater than 1 μm, or no greater than 0.5 μm.

As used herein, the singular terms "a," "an," and "the" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optical measurement equipment, comprising:
an adjustment apparatus; and
at least two image capturing devices having a depth-of-field and attached to the adjustment apparatus, wherein a position of each of the image capturing devices is adjustable in three-dimensional directions by the adjustment apparatus and orientations of the at least two image capturing devices are adjustable in a counter manner with respect to each other such that a portion to be measured of a workpiece is located within the depth-of-field of the image capturing devices, and
wherein the orientations of the at least two image capturing devices are in a plane perpendicular to a surface of the workpiece;
wherein the three-dimensional directions include a first direction, a second direction, and a third direction, the workpiece extends along the first direction, the second direction is perpendicular to the first direction, and the third direction is perpendicular to a plane defined by the first direction and the second direction, and further comprising a distance measuring apparatus attached to the adjustment apparatus moveable along the first direction or the second direction for measuring a distance in the third direction between the distance measuring apparatus and a portion to be measured of the workpiece for the adjustment apparatus to adjust the position of each of the image capturing devices.

2. The optical measurement equipment of claim 1, wherein the adjustment apparatus includes a holding structure, and the image capturing devices are movably or rotatably attached to the holding structure.

3. The optical measurement equipment of claim 1, wherein the adjustment apparatus includes a holding structure and a first guide structure, the image capturing devices are attached to the holding structure, and the holding structure is movably attached to the first guide structure.

4. The optical measurement equipment of claim 3, wherein the adjustment apparatus further includes a second guide structure, and the first guide structure is movably attached to the second guide structure.

5. The optical measurement equipment of claim 4, wherein the holding structure is movable on the first guide structure in the first direction and the first guide structure is movable on the second guide structure in the second direction.

6. The optical measurement equipment of claim 4, wherein the adjustment apparatus further includes a third guide structure, and the second guide structure is movably attached to the third guide structure, and the at least two image capturing devices are movably attached to the holding structure.

7. The optical measurement equipment of claim 6, wherein the second direction is perpendicular to the third direction, and wherein the first guide structure is movable on second guide structure in the second direction and the second guide structure is movable on the third guide structure in the third direction.

8. The optical measurement equipment of claim 1, wherein the portion to be measured of the workpiece is located within the depth-of-field of the image capturing devices within a range of a temperature variation.

9. An optical measurement equipment, comprising:
an adjustment apparatus;
a distance measuring apparatus attached to the adjustment apparatus for measuring a distance between the distance measuring apparatus and a portion to be measured of a workpiece; and
at least two image capturing devices attached to the adjustment apparatus, wherein the at least two image capturing devices are adjustable by the adjustment apparatus according to the measured result from the distance measuring apparatus,
wherein the at least two image capturing devices are movable by the adjustment apparatus in opposite directions.

10. The optical measurement equipment of claim 9, wherein the adjustment apparatus includes a holding structure, the distance measuring apparatus is fixedly attached to the holding structure, and the image capturing devices are movably or rotatably attached to the holding structure.

11. The optical measurement equipment of claim 9, wherein the adjustment apparatus includes a holding structure and a guide structure, the distance measuring apparatus is fixedly attached to the holding structure, the image capturing devices are attached to the holding structure, and the holding structure is movably attached to the guide structure.

12. The optical measurement equipment of claim 9, further comprising a controller for receiving the measured result from the distance measuring apparatus to control the adjustment apparatus.

13. A method for measuring warpage of a workpiece, comprising:
(a) disposing a workpiece on a receiving surface under at least two image capturing devices, wherein the at least two image capturing devices have a depth-of-field;
(b) heating or cooling the workpiece; and
(c) capturing an image of the workpiece by the image capturing devices after the heating or cooling,
wherein (c) includes adjusting a position of at least one of the image capturing devices such that a portion to be measured of the workpiece is located within the depth-of-field of the image capturing devices,
wherein the at least two image capturing devices comprise a first image capturing device having a first image capture direction and a second image capturing device having a second image capture direction, the first image capture direction is from the first image capturing device to the portion to be measured of the workpiece, and the second image capture direction is from the second image capturing device to the portion to be measured of the workpiece, and
wherein (c) includes adjusting the at least two image capturing devices such that an intersection of the first image capture direction and the second image capture direction is located at a top surface of the portion to be measured of the workpiece.

14. The method of claim 13, wherein (c) includes moving the image capturing devices in a first direction, and the first direction is substantially parallel with a normal direction of the receiving surface, or (c) includes rotating the image capturing devices.

15. The optical measurement equipment of claim 1, further comprising a controller for receiving the measured result from the distance measuring apparatus to control the adjustment apparatus.

16. The optical measurement equipment of claim 1, wherein the adjustment apparatus includes a holding structure, the distance measuring apparatus is fixedly attached to the holding structure, and the image capturing devices are movably attached to the holding structure.

17. The optical measurement equipment of claim 9, wherein the workpiece is in a plane defined by a first direction and a second direction and the distance measuring apparatus is moveable along a direction non-parallel to the first direction and the second direction.

18. The optical measurement equipment of claim 6, wherein the at least two image capturing devices are movable along the holding structure.

19. The optical measurement equipment of claim 18, wherein the at least two image capturing devices are movable along the holding structure in opposite directions.

20. The optical measurement equipment of claim 9, wherein the at least two image capturing devices are movable in opposite directions to adjust a distance between the at least two image capturing devices such that the portion to be measured of the workpiece is located within a depth-of-field of the at least two image capturing devices.

21. The method of claim 13, wherein the first image capture direction is an optical axis direction of the first image capturing device, and the second image capture direction is an optical axis direction of the second image capturing device.

* * * * *